United States Patent [19]
von Sichart et al.

[11] Patent Number: 4,661,952
[45] Date of Patent: Apr. 28, 1987

[54] METHOD FOR TRANSMITTING DATA IN A TELECOMMUNICATIONS EXCHANGE

[75] Inventors: Frithjof von Sichart; Jörg Eberspächer, both of Munich, Fed. Rep. of Germany

[73] Assignee: Siemens Aktiengesellschaft, Berlin and Munich, Fed. Rep. of Germany

[21] Appl. No.: 784,711

[22] Filed: Oct. 4, 1985

Related U.S. Application Data

[63] Continuation of Ser. No. 577,747, Feb. 7, 1984, abandoned.

[30] Foreign Application Priority Data

Feb. 11, 1983 [DE] Fed. Rep. of Germany ....... 3304823

[51] Int. Cl.$^4$ ................................................ H04J 3/24
[52] U.S. Cl. ........................................ 370/94; 370/60; 370/89
[58] Field of Search ............................ 370/94, 89, 60

[56] References Cited

U.S. PATENT DOCUMENTS 4,154,983  5/1979  Pederson .............................. 370/94
4,367,549  1/1983  Vachee ................................. 370/91

FOREIGN PATENT DOCUMENTS 2918539  11/1982  Fed. Rep. of Germany .

OTHER PUBLICATIONS

"Signaling and Frame Structures in Highly Decentralized Loop Systems", Zafiropulo et al., pp. 309 to 315, 1972.

"Carthage: A multiservice Local Network on a Fiber Optics Loop", J. Favre, Local Computer Networks, 1982.

Primary Examiner—Joseph A. Orsino, Jr.
Attorney, Agent, or Firm—Jeffrey P. Morris

[57] ABSTRACT

A method of transmitting data in a telecommunications exchange via a ring line system which allows information items to be transmitted in periodically recurring pulse frames. The pulse frames are split into at least two sub-frames, where in the first sub-frame the information is transmitted in a continuous transmission process whereas in the second sub-frame the information is transmitted in a burst process. The first sub-frame is divided into time slots which are allocated, as time channels, to a subscriber station for the establishment of a connection, such as a speech connection. In the second sub-frame the time slots are combined to form one single data channel for the transmission of data bursts. Access to the second sub-frame is gained by means of an item of so-called token information. Also transmitted as the data burst is information which contains a statement concerning the free/seized state of the time channels in the first sub-frame and which serves to bring up-to-date corresponding tables at the subscriber stations.

7 Claims, 10 Drawing Figures

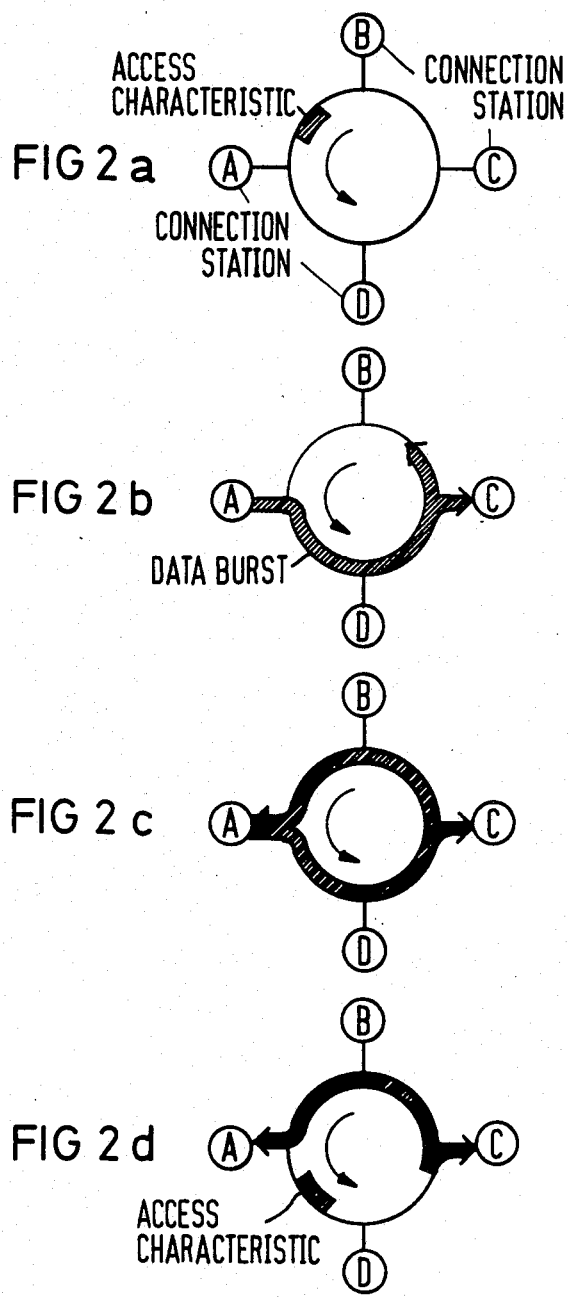

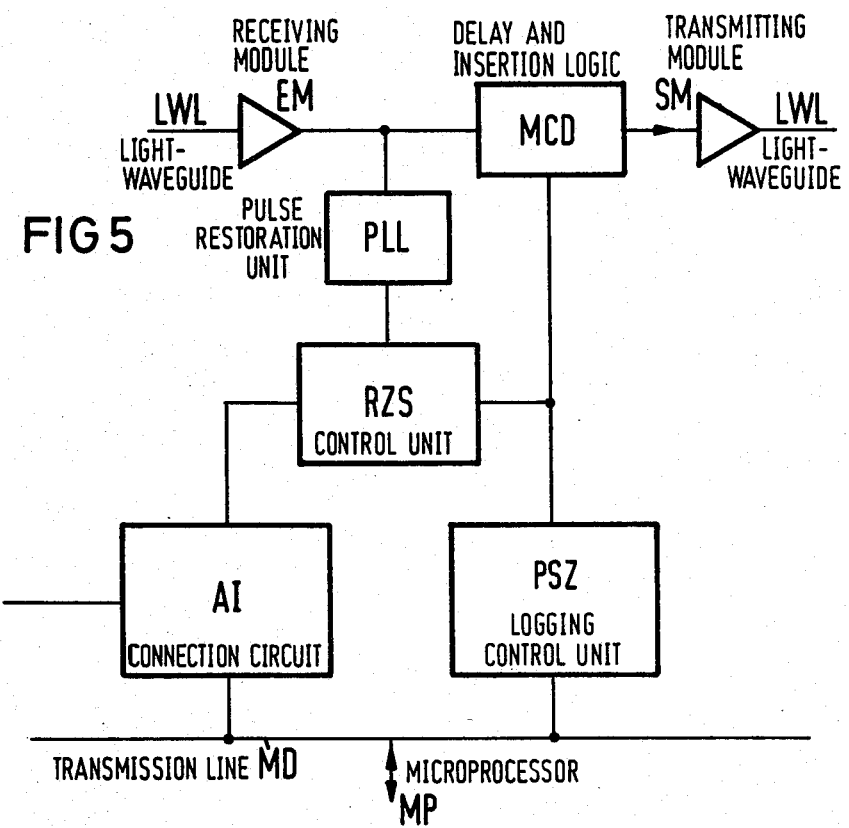
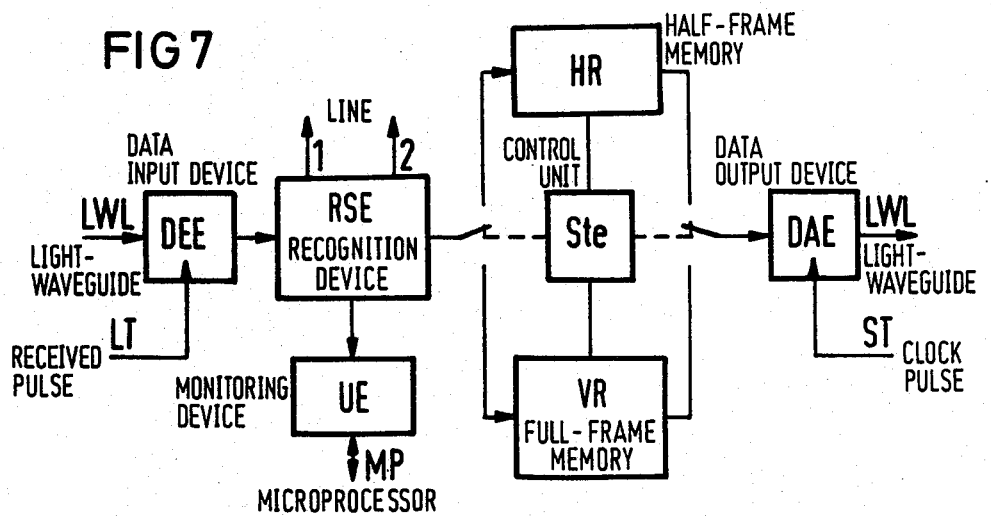

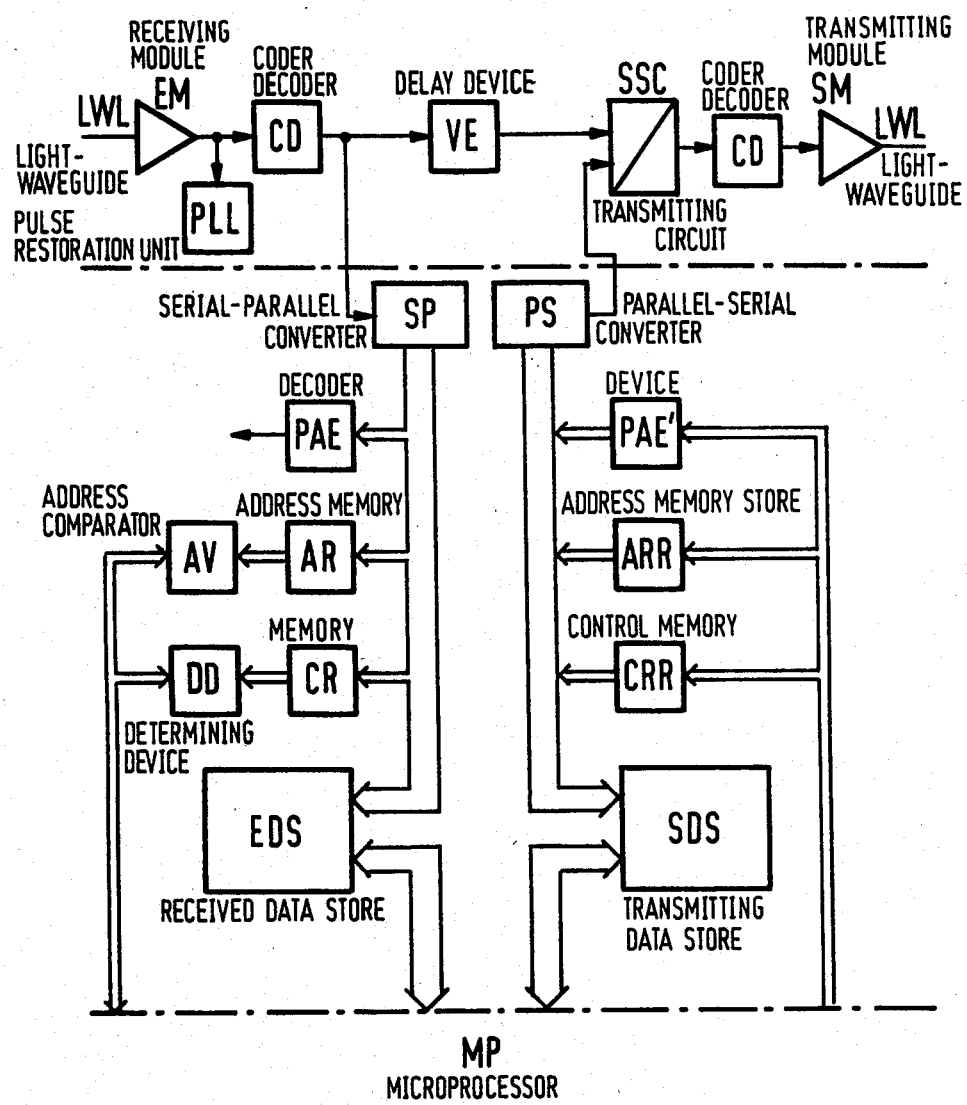

METHOD FOR TRANSMITTING DATA IN A TELECOMMUNICATIONS EXCHANGE

CROSS-REFERENCE

This is a continuation of Ser. No. 577,747 filed Feb. 7, 1984 now abandoned.

BACKGROUND OF THE INVENTION

The invention relates to a method of transmitting data in a telecommunications exchange, such as a telephone PBX, which has a data transmission line system, which can be an optical data transmission line system, with various connection stations, such as subscriber stations, connection line sets and terminal devices. The various connection stations for information transmission between at least two connectable connection stations, may possess different traffic flow properties in respect of the quantity and speed of the data transmission and in respect of the transmission process—for example continuous (stream) transmission process and/or burst process. Also, at least the first process is based on the time slot process where periodically recurring time slots are combined to form a pulse frame which transmits a specific quantity of data in a predetermined period of time (for example 1024 bits in 125 microseconds). The time location is clearly defined for this quantity, and the items of data which are transmitted in the various processes are exchanged via a common data transmission line group which is connected to all the various connection stations such as subscriber stations, connection line sets and terminal devices, for which purpose via the data transmission line group an uninterrupted sequence of storage volume, defined by start and end characteristics and corresponding to the pulse frame, can be continuously made available to the connection stations.

In data transmission line systems to be used in communications technology, for example optical data transmission line systems especially for so-called local area networks (LAN), subscribers and devices must be connected which possess highly differing traffic flow properties. When fully digital terminal devices, for example, telephone stations, video devices and the like are connected, items of data information must be transmitted continuously. In addition however, with regard to automated office communications, terminal devices must be connected which produce intermittent traffic flow. These devices consist, for example, of high-resolution graphic terminals, data bank processors, and text terminals. These devices require a transmission capacity of several megabits per second (MBit/s), for fractions of seconds.

An article by P. Zafiropoulo and E. H. Rothauser in proceedings ICCC, 1972, pages 309 to 315, described how a continuous (stream) transmission process and a burst process can be used in ring systems. In the system described therein the allocation of the time slots for the continuous transmission process is carried out by observing a "busy" bit contained in each time slot. A station which is ready for transmission discovers a free time slot and then inserts the target address of the receiver into this time slot. If the receiver is not engaged it responds in the same time slot with an appropriate item of information so that a connection is established via this time slot. However, this signalling in the time slot has the disadvantage that less space or no space is available during the established connection for the signalling activities which are necessary in state of the art digital communication systems. In addition the disadvantage exists that the transmission capacity is further impaired by the accomodation of the aforementioned "busy" bit and the sender address and target address in each time slot. In order to transmit data parcels in this system, it is necessary to provide a separate data transmission line group where the access takes place in the same way with a "busy" bit. This system is not successful in state of the art digital communications in combining the continuous (stream) transmission process with the burst process for transmission via a data transmission line group.

An article by I. Favre in "Proceedings International Conference on Local Computer Networks" 1982, Florence, pages 23 to 37, discloses how a time slot frame can be divided into two sub-frames for an optical ring system. Here the first sub-frame serves as the frame for the continuous transmission of information items, whereas data bursts are transmitted in the second frame. The second sub-frame is allocated by means of a control array which is continuously accommodated in this channel and which contains information as to whether the data array of the sub-frame in question is free or engaged. Only when a free characteristic exists can a data burst be input. Thus in this process each sub-frame must contain a free/engaged characteristic of this type and the address of the transmitting station and of the target must be added. This also results in the unnecessary loss of a large quantity of storage capacity.

European patent application No. 0 054 077 discloses a process which does not use a frame-synchronous time slot structure, but in which information items are transmitted continuously and in bursts. Here access is provided by means of the transmission of an item of access entitlement information via the data transmission line group, and this is done in such a way that a station which is ready for transmission can transmit when it receives this access information. When this occurs a data burst can be transmitted from this station. Continuous data items can be transmitted only in restricted form in this process since in the event of heavy traffic loading periodic access within a prescribed period of time is not guaranteed. The larger the data burst for non-continuous traffic, the greater the time shift. As a result speech traffic for long distance conversations can, for example, become impossible. In order to nevertheless ensure continuous traffic, an additional monitoring circuit is required in this system. On the basis of requests from the stations transmitting the continuous information items, this monitoring circuit ensures that at periodic intervals it is possible to interrupt the normal access for the transmission of data bursts. Then, in place of the normal access information, a special item of information is transmitted which ensures access only to those stations having a continuous traffic flow.

SUMMARY OF THE INVENTION

The object of the present invention is to provide a simple method for ensuring both continuous traffic flow and allowing data bursts of arbitrary length to be transmitted between any two subscriber stations.

This is achieved in that a pulse frame of this type is subdivided into at least two sub-frames, where the quantities of data to be transmitted in the different sub-frames are arbitrarily divided, and in the first sub-frame the individual data channels formed by the time slots can be seized independently of one another and for continuous, non-burst data exchange, in particular speech transmission, via the corresponding data transmission line group, whereas in the second sub-frames the time slots form one single data channel for the transmission of data bursts via the same data transmission line group, and where furthermore the seizure of time slots (time channels) in the first sub-frame is carried out by a connection station in dependence upon items of information—transmitted in one of the two sub-frames—relating to the free or busy state of the time slots (time channels) contained in the first sub-frame.

In this way it is possible to seize time slots (time channels) in order to conduct, for example, speech connections, video-transmission connections and the like, in a simple manner in dependence upon items of information which relate to the free state or busy state and which are transmitted—during divided information transmission frames—in one of the sub-frames contained within this frame. The access system can be used in a simple manner both in ring network structures and in star network structures. In addition, all the connection stations enjoy equal priority and the allocation control is not subject to conditions in respect of superordinate functions of specific connection stations.

In a preferred embodiment of the invention, the method can be carried out such that, in one data channel of all the individual channels offered to a connection station in a specific time cycle in the corresponding sub-frame, an access characteristic (token) which offers access to the second sub-frame which serves as individual data channel, in the connection circuit assigned to a connection station which initiates a connection establishment and terminates a connection, causes the input of items of data information in the second-sub frame. The second sub-frame is operated as an individual data channel, which items of data information characterize the seizure and release of a time slot (for example time channel m−1) in the first sub-frame and are transmitted via the common data transmission line group from connection station to connection station in order to bring up-to-date a table containing the free/engaged states of the time slots in the first sub-frame, by means of the switching means assigned to this connection circuit.

In this way it is possible to use one data channel not only for arbitrary data transmission from a connection station but also in order to use this data transmission in order that, in this data channel which is provided as a second sub-frame, a free time may be seized by assigned time slots within the other sub-frame and in addition in order to bring up-to-date tables which are contained at the connection stations and in which the free/engaged state of the time slots of the aforementioned sub-frame are characterized. The procedure necessary for this purpose does not involve any basically differing process measures since the access to the individual data channel exists anyway and information items for at least all the participating connection stations can be transmitted via the individual data channel.

In another preferred embodiment of the invention the several method can be carried out such that in one single data channel of the data channels offered to a connection station in a specific cycle, an access characteristic (token), which facilitates access to a specific time slot (time channel) among the plurality of time slots (time channels) contained in a first sub-frame in order to establish transmission paths which can be seized continuously for a specific length of time by two or more than two connection stations for the purposes of communications exchange, in particular speech, video and the like—in the connection circuit assigned to a connection station which initiates and terminates a connection establishment—controls the input of items of data information in this specified time slot and the seizure and release of a time slot among the aforementioned plurality of other time slots in the first sub-frame. Also, items of data information are transmitted to all or only to specific connection stations connected to the common data transmission line group in order to bring up-to-date a table containing the free/engaged states of the aforementioned time slots in the first sub-frame.

In this way, in accordance with another preferred embodiment of the invention, a specific time slot among a plurality of existing time slots for the transmission of continuous time channels to be seized for a specific length of time for communications exchange can be used for seizure and also for the transmission of items of data information relating to the free/engaged states. The access process for the specified time slot corresponds to that for the individual channel so that the necessary control flow processes can easily be accomodated in the system for this process.

In accordance with another preferred embodiment of the invention, only on the re-occurence of the input information items relating to the seizure and release of a time slot at the originally input connection station does the seizure of a time slot (time channel) lead to the final seizure and final release of the time slot in question.

This ensures in a simple manner that the seizure of a free time slot and the release of a seized time slot is first acknowledged before corresponding items of information are forwarded to other connection stations in order to bring the tables up-to-date.

In accordance with another preferred embodiment of the invention, the existing subscriber stations and/or connection line sets and terminal devices are combined to form groups and only in the case of one or a few of these stations is a store provided in order to accomodate the items of table information for seized and/or free time slots (time channels), and in each subscriber station and connection line set and in each terminal device which does not contain a table it is indicated at which station, on the seizure of a free time slot (time channel), the table for establishing the state of the time slot (time channel) which is to be seized is available.

In this way the number of necessary tables can in some cases be reduced.

Other features and advantages of the present invention will become apparent from the following detailed description, and from the claims.

For a full understanding of the present invention, reference should now be made to the following detailed description and to the accompanying drawings.

BRIEF DESCRIPTION OF THE DRAWINGS

FIGS. 2a–2d show the access procedure (token) used in the method in accordance with the invention.

FIG. 5 shows a fundamental circuit diagram of a subscriber connection station connected to the frame-synchronous ring.

FIG. 6 shows further details of the subscriber connection station represented in FIG. 5.

FIG. 7 is a detailed view of the frame compensating module required in each basic ring.

DETAILED DESCRIPTION

Figure 1:
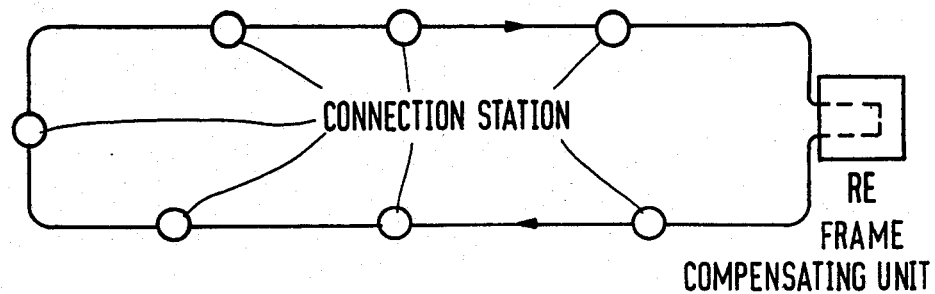
FIG. 1 shows diagrammatically a basic ring in a frame-synchronous system with a frame compensating unit, by means of which it is possible to form a local network for speech and data transmission, in, for example, a PBX.

In modern office communications systems in which data of various types must be transmitted and in fact some data must be continuously transmitted and other data must be transmitted at a high speed, various transmission processes and access procedures are used. In office communications systems of this kind for example speech information, video-transmission information and the like are continuously transmitted for specific connection times. The transmission quality of the speech and the video information is dependent upon this continuity. However, in office communications networks of this kind data blocks of arbitrary lengths, for example data bank contents, must be transmitted at a high speed and non-continuously. A local network of this type can consist either of a plurality of fundamental rings logic-linked to one another or of loop systems. In principle any type of network topology is possible; i.e. either meshed, star-shaped, circular or of tree or bus formation. The ring structure is not vitally essential to the present invention. However the described embodiments are based upon the ring structure. FIG. 1 represents a fundamental ring in a frame-synchronous system with frame compensating unit RE. The number of connection stations to be connected to the fundamental ring is dependent upon the number of time slots or time channels available for connection establishment in a pulse frame, and likewise upon the planned traffic intensity value.

Before the frame structure will be discussed, the access procedure which is to be employed will be explained with reference to FIGS. 2a–2d. Via the ring, an uninterrupted sequence of pulse frames governed by the length of the ring is transmitted, where each pulse frame consists for example of 128 time slots each containing 8 data bits, so that a total of 1,024 bits can be transmitted in a pulse frame. The sampling frequency is selected for example to be such that one pulse frame can be transmitted within 125 microsecond periods. This results in a bit repetition frequency of 64 KBits/s per time slot (i.e. per time channel). If we now refer to FIG. 3 for additional explanation, it will be seen that frame K containing 1 to n time slots is subdivided as follows. The first time slot, referenced R, serves for purposes of frame synchronization whereas time slots 2 to m (i.e. m−1 time slots), form a first sub-frame whereas the time slots m+1 to n (i.e. thus n-m time slots), are referred to as the second sub-frame. The time slots (i.e. time channels), provided in the first sub-frame serve for the continuous transmission of information items, thus speech transmission, video-transmission and the like, whereas the time slots of the second sub-frame are combined to form an overall individual data channel. The time slots of the first sub-frame are each allocated to a connection. The individual data channel of the second sub-frame is in each case assigned to an individual connection for high-speed data transmission. In order to gain access to this data channel the access procedure represented in FIG. 2a–2d is employed.

In each of the successive pulse frames, each of which pass by a connection station in turn, two sub-frames are thus available and only in one single sub-frame is an access characteristic available as a free characteristic (see FIG. 2a). In FIG. 2b it has been assumed that station A retains the access characteristic and transmits data, for example to connection station C. It will be clear from FIG. 2c that during the second cycle the data items which have been transmitted in addressed form from connection station A to connection station C are copied in this station and the data burst returns unimpaired to connection station A where it is allocated. On the conclusion of the transmission of the data burst (i.e. in practice following the reception of its own burst head), connection station A transmits a regenerated access characteristic which is to indicate that the data channel is available for another connection station. This process is described for example in the magazine "Telecom Report 5", 1982, Vol. 2, pages 66 to 71 and in U.S. Pat. No. 3,597,594. The subject of the arrangement in accordance with the invention is the use of this access procedure for the seizure of free time slots for the continuous transmission of specified information items, for example speech information and video-information.

Figure 3:
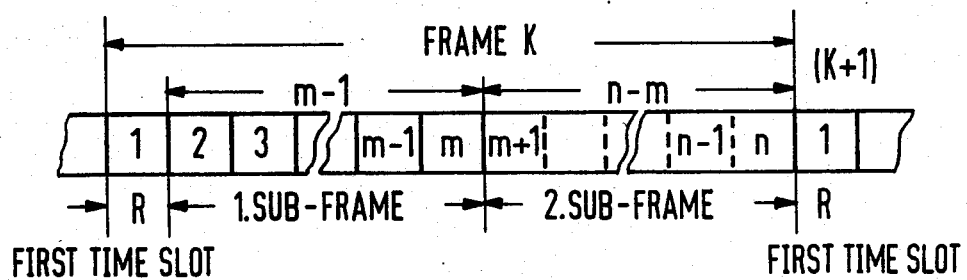
FIG. 3 shows the frame structure of the method in accordance with the invention (the so-called hybrid process).

The provided division of pulse frame K, shown in FIG. 3, into at least two sub-frames enables different transmission processes to be conducted simultaneously. The continuous transmission process (so-called stream process) is based on the normal, known time slot process as used in PCM technology. This relates to periodically recurring time slots and a specified quantity of data can be transmitted in a predetermined period of time within the pulse frame. The time location of the time slots, which are also known as time channels, is clearly defined. In following pulse frames, in a time slot or time channel allocated to a connection, the items of information required for this connection, speech information and video-information and the like, are transmitted. In the second sub-frame of the same pulse frame, the time slots are combined to form one individual channel and in this individual channel items of data information can be transmitted by the so-called burst process. An arbitrary number of sub-frames in consecutive pulse frames can be used to transmit data bursts. Access to a sub-frame of this kind is provided by means of the access procedure already described. This means that in a sub-frame, an access characteristic is forwarded from connection station to connection station, and the connection station which acquires the access is that which is the first to "retain" this access characteristic. This connection station can then transmit a data burst to an addressed receiving station and on the arrival of the burst head in its own station, a new access characteristic is circulated in the second sub-frame. Now another connection station acquires access to the individual data channel.

Figure 4:
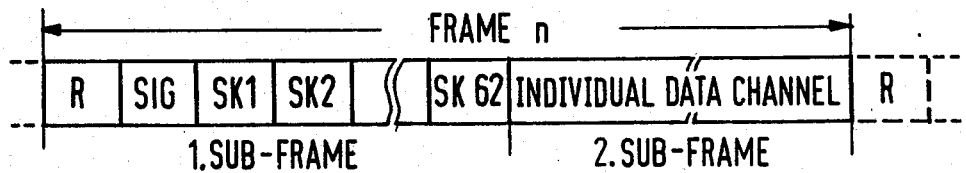
FIG. 4 shows an alternative frame structure.

Arbitrary data items can be transmitted in this individual data channel. Each control unit of each connection station is now aligned so that the individual data channel is also requested when a request is emitted for the seizure of a time slot or time channel in order to establish a connection to a connection station within the basic ring or a superordinate ring or another basic ring or to a connection station outside of the system. Access is provided in the same way as in the case of the request for the transmission of a data burst. In the event that the individual data channel is seized when the access characteristic is discovered, a free time slot is seized in that, first, with the assistance of a memory provided at the connection station and the table contained in the memory, a time slot is established which has been characterized as free. The address of this time slot and of the connection station itself is fed as a data burst in the data individual channel of the second sub-frame of a pulse frame or consecutive pulse frames. These items of information are forwarded from connection station to connection station and at each connection station are used to bring up-to-date the tables contained therein in memories, to indicate that the now seized time slot is seized rather than free. When the burst head of a data burst returns to the originally transmitting connection station, an access characteristic is re-input in the relevant sub-frame of the individual data channel and the connection station in question has the time slot which it has seized available for the establishment, for example, of a telephone connection. The data items/addresses required for this purpose are input. The frame structure, represented in FIG. 4, for narrow-band subscriber rings differs from the frame structure shown in FIG. 3 inasmuch as a signalling slot or signalling channel is additionally provided in the first sub-frame. This signalling channel can be used similarly in the individual data channel in order to seize a free time slot for connection establishment. In this case the signalling time slot likewise contains an access characteristic which allows a connection station to gain direct access to this time slot if a request is emitted for an outgoing connection. If in this case the corresponding time slot is allocated via the access characteristic, a characteristic of the time slot which is to be seized is again forwarded from connection station to connection station, and in each connection station the table contained in the memory is brought up-to-date for free/engaged states. When the head of the data burst returns to the connection station which has initiated the call, the latter inputs a new access characteristic in the special time slot in question. Now the connection station can input the information for the connection establishment in the time slot which is now seized.

All the connection stations are fundamentally similar in respect of the allocation control. In the described example the information flow via the data transmission line which is connected in a ring is unidirectional. The data transmission line group can consist either of copper lines or light waveguides, coaxial cables or twisted pairs of wires. The only common unit consists of the frame compensating unit. In the frame-synchronous systems, frame compensating unit RE, as represented in FIG. 1, brings about the necessary compensation of the physical transit time in the ring to a whole-numbered multiple of the frame duration. As already described with reference to FIG. 3, a frame synchronization word is accomodated in first time slot R. The frame synchronization word is gated in by the frame compensating unit mentioned above.

In the time slots of the sub-frame, items of data information can be both received and transmitted. Thus this means that one time slot is adequate for a speech connection for the items of data information to be transmitted in both directions (e.g. corresponding to speech). If it is assumed that in frame K, shown in FIG. 3, n is equal to 128 and m is equal to 64, the overall data quantity for the sub-frame amounts to 4.096 MBit/s. As described in the following with reference to FIGS. 5–7, by counting the frame synchronization slot including the time slots of the first sub-frame, the logic in every connection station recognizes the start of the second sub-frame. If the differential Manchester code known per se is used as transmission code, in the case of the described access procedure the start and end of a burst can be recognized via so-called code infringements. A complete data burst of arbitrary length extends over a plurality of frames K and starts and ends with the aforementioned "code-infringement-characteristics." The data burst is interrupted exactly periodically by the time slot for the frame synchronization and the first sub-frame. No special characterization in the second sub-frame is required for this purpose.

FIG. 5 indicates that the connection stations arranged in the ring system each consist of the following functionally essential components:

(a) Optical receiving module EM and optical transmitting module SM including pulse restoration unit PLL (Phase - lock-loop). The receiving module receives signals via light waveguide LWL and the transmitting module forwards these signals via light waveguide LWL. All the received/transmitted signals are fed uninterrupted via the ring and are merely copies (i.e. thus not withdrawn) by each connection station.

(b) A frame synchronization and time slot control unit RZS, the fundamental constituents of which are comparision units and counters.

(c) A logging control unit for access characteristics PSZ with one terminal connected to a data transmission line MO which leads to microprocessor MP assigned to the connection station.

(d) The frame synchronization and time slot control unit RZS is also connected to connection circuit AI which is likewise connected via data transmission line MD to microprocessor MP for controlling the switch-through to terminal devices, for example data terminal devices, telephone terminals devices, and video terminal devices.

On the arrival of the data information items of the pulse frame, the clock rate thereof is determined by clock rate determining device PLL in that the time slots are counted. The logging control unit for the access characteristics monitors the second sub-frame for the presence of the access characteristic in the event that a free time slot has been seized by a terminal device. The coding/decoding logic which is assigned to each connection station and is connected in the ring provides for recoding into binary characteristics and recognition of the code infringements for establishing the start and end characteristics of data bursts. All the processes which are connected with determining the access characteristics, its temporary erasure, and its re-input at the end of a data burst are controlled by allocated microprocess MP. The transmitted data bursts can be fed from various terminal devices connected via device AI to the data transmission line group, i.e. to the ring, for purposes of transmission. Similarly, data bursts which arrive in the connection device can be fed to a terminal device of this kind in accordance with the characterized type of the receiving terminal device. Microprocessor MP of each connection station is assigned a table indicating the seized and free states of the time slots. This table is brought up-to-date by data parcels received from a transmitting connection station which seizes and releases a time slot. In the data burst it is sufficient to characterize the time slot and the fact whether release or seizure must take place. However, it is also possible to construct the complete table with the slot seizure in the data burst and to forward this from subscriber in order to simplify the bringing up-to-date process at the individual connection stations. The bringing up-to-date process is carried out individually in respect to each connection station.

However it is also possible to centralize the allocation of the time slots in that administration of the tables for the seized/free state is carried out only at specific connection stations. In this case when an access characteristic is received at a connection station which requests a free time slot, this connection station must emit a data burst which contains the request for seizure of a free time slot together with its own address; whereupon the administering connection station must add an address of a free time slot, and whereby the connection station seizing a time slot is then allocated the time slot when the self-transmitted data burst is received.

FIG. 6 shows details of the logging control unit for access characteristics PSZ of the units assigned to a connection station. From this it will be clear that the incoming information items are first input via series-parallel converter SP and are output again via a parallel-series converter PS. The output lead to transmitting circuit SSC logic-links the information items circulating via the ring and the information items which are to be input. From this transmitting circuit the information items proceed via coder CC to transmitting device SM and then via the data transmission line group, which is for example one single light waveguide LWL. The information items which arrive at the connection station are fed via receiving device EM and a decoder CD to the previously mentioned series-parallel converter SP and to delay device VE assigned to the connection station. This delay device is necessary in order to be able to change received and passing bit flow, which for example is delayed by 16 by 24 bits.

The information items which are fed via the series-parallel converter SP of the logging control unit for the access characterization are conducted in parallel to various devices. Equally the parallel-series converter is supplied by various corresponding devices with the information items for forwarding. The start or end of a data burst is determined via decoder PAE. In addition, an address of the transmitting station contained in the data burst is recorded in address memory AR, and in connected address comparator AV it is established whether the received data burst is destined for a corresponding connection station or whether this data burst serves to bring up-to-date the free/seized table. Via memory CR and detecting device DD the access characteristic is recognized and is caused to be erased via further control memory CRR. Received data store EDS evaluates the received data burst in cooperation with connected microprocessor MP. If additional data items are to be transmitted in the data burst, all the data items to be transmitted within a data burst from a transmitting connection station are fed via transmitting-data store SDS and parallel-series converter PS of transmitting circuit SSC and the coder CC to the data transmission line group to, for example, the light waveguide and thus to the ring. Items of address information which are to be additionally input are generated via address memory store ARR whereas other items of information relating to the characterization of the start and end of the data burst are generated via device PAE'.

FIG. 7 represents the frame compensating unit which is common to all the basic rings and thus to all the connection stations connected to a basic ring. This frame compensating unit serves, in a frame-synchronous system, to ensure that the overall cycle time including all the delays in the connected connection stations amount to a whole-numbered multiple of the frame duration, so that arbitrary shifts of the frame are not permitted; rather the frames match a fixed time program. This frame compensating unit is provided with an integrated LSJ-module which executed this function fully automatically. This frame compensating unit simultaneously serves as central clock pulse generator for the connected connection stations. The frame compensating unit can be assigned to one connection station among all the existing connection stations, but then the functions do not influence the individual functions of the connection station in question.

It is seen from FIG. 7, that the frame compensating module contains data input device DEE which is not only supplied with the data via the light waveguide LWL but also with received pulse LT which is derived from the received clock pulse train. The incoming data items are fed via data receiving device DEE to frame-synchronous-word recognition device RSE. In this device the synchronous pulses are fed via line 1 after the lack-of-synchronism pulses have been recognized via line 2. Monitoring device UE monitors the function of frame-synchronous-word recognition device RSE, and it reports the function to a connected microprocessor MP. Via half-frame intermediate memory HR and full-frame intermediate memory VR in which the information items are stored which are dependent upon commands fed via monitoring device UE and the microprocessor MP to control unit Ste, it is possible to intermediately store the data of a half-frame or a full-frame for purposes of delay and matching the correct clock pulse train. Output takes place in dependence upon the clock pulse train ST which is required for the transmitting process and which is supplied by a permanent clock pulse generator. The data items are circulated in the ring via data output device DAE.

There has thus been shown and described a novel method for transmitting data in a telecommunications exchange, in particular a telephone PBX, with a data transmission line system, in particular with an optical data transmission line system, which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. Method for a telecommunications system, in particular a telephone PBX, with a data transmission line system, in particular an optical data transmission line system, and with different connection points, in particular with subscriber connection points, with connecting line transmissions and with terminal devices, which all have different traffic properties for data transmission between at least two connectable connection points with respect to data transmission quantity and speed as well as with regard to transmission method, which may be a continuous transmission method, and where the continuous transmission method is based on a time slot combination process, in which periodically recurring time slots are combined in a pulse frame to be transmitted as a certain data quantity in a given time, in which for the certain data quantity a time slot position is clearly defined, and where the data transmitted are exchanged via a common data transmission line system connected with all different connection points, wherein an uniterrupted sequence of data storage volume between the start and end characteristics of the pulse frame is continuously available to the connection points, the improvement to the method further including the steps of (1) dividing a pulse frame into at least two sub-frames, the data quantities to be transmitted in the different sub-frames being divided arbitrarily into time slots; (2) in the first sub-frame, seizing the individual data channels formed by the time slots (1 to M) independently of one another in a time slot combination process for continuous, non-packeted data exchange, in particular, voice transmission; (3) in the second sub-frame, forming a single data channel from the time slots (N−M) primarily for the transmission of data packets via the same data transmission line group, and (4) transmitting in the single data channel, an access characteristic permitting access of all connection points to this data channel and in conjunction with this access characteristic, from a connection point initiating or ending a connection in one of the individual data channels formed in the first sub-frame, data which define the seizure or release of this individual data channel (e.g. time channel M−1) is delivered and transmitted in the single data channel from connection point to connection point for the purpose of updating tables associated with the connection points and containing the free/seized states of the time slots in the first sub-frame.

2. A method in accordance with claim 1, wherein said transmission method is a packet transmission method.

3. The method of claim 1, wherein the two sub-frames are commonly preceded by at least one information bit which serves to control frame synchronization.

4. The method of claim 1, wherein the existing connection points are combined to form groups and only at one or a few or these stations is memory provided to accomodate the table data for seized and/or free time slots, and in each connection point which has no table it is indicated at which connection point, on the seizure of a free time slot, the table for determining the state of the time slot which is to be seized is available.

5. The method of claim 1, wherein the data to be transmitted as a data burst from a connection point can be divided among an arbitrary number of second sub-frames contained in consecutive frames and thus among individual data channels.

6. The method of claim 1, wherein only on the rearrival of the input data relating to the seizure and release of a time slot at the originally input subscriber station does the seizure of a time slot lead to the final seizure or release of the time slot in question.

7. The method of claim 6, wherein not until after the final seizure or release of a time slot of the first sub-frame or the individual channel of the second sub-frame can the corresponding data for bringing up-to-date the free/seized states be actively connected to the subscriber stations in question.

* * * * *